B. W. Nichols.
Jam Nut.
No. 89,066.  Patented Apr. 20, 1869.
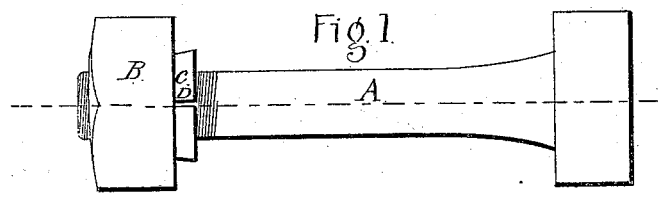
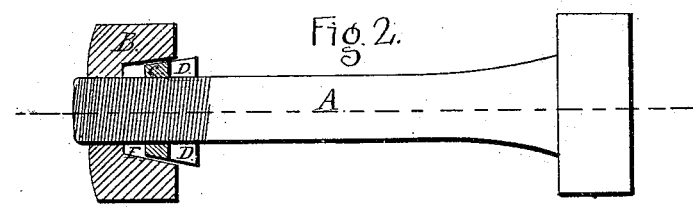
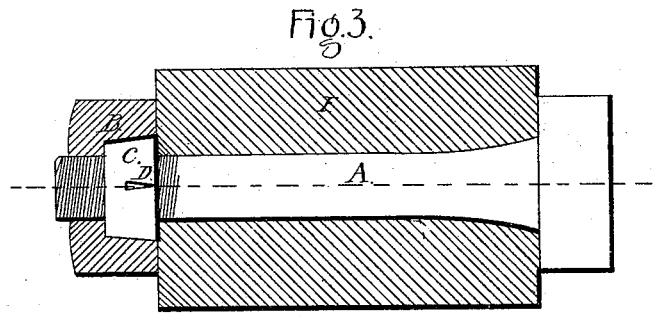
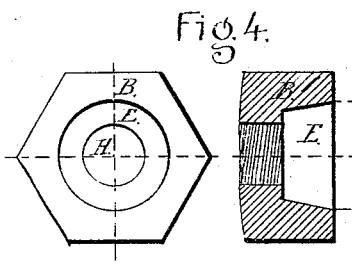 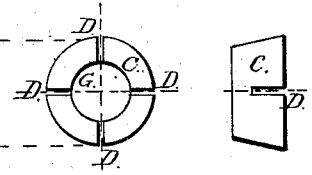
Witnesses:  Inventor:
D. Hammond  B. W. Nichols
Ed. K. Beebout  By John Abbott, Attorney

BYRON W. NICHOLS, OF CANTON, OHIO, ASSIGNOR TO HIMSELF AND WILLIAM R. RAYNOLDS, JR., OF SAME PLACE.

*Letters Patent No. 89,066, dated April 20, 1869.*

IMPROVEMENT IN JAM-NUTS.

The Schedule referred to in these Letters Patent and making part of the same.

*To all whom it may concern:*

Be it known that I, BYRON W. NICHOLS, of Canton, county of Stark, and State of Ohio, have invented a new and improved Jam-Nut; and I do hereby declare that the following is a full, clear, and exact description of my invention, reference being had to the accompanying drawings, forming part of this specification, and to the letters of reference marked thereon, of which drawings—

Figure 1 is an elevation of my improved jam-nut applied to a bolt.

Figure 2 is a sectional elevation of the same.

Figure 3 is a sectional elevation, showing the application of the nut and bolt to a block.

Figures 4 are detailed views of the nut proper.

Figures 5 are detailed views of the jam-washer used in connection with the nut.

My invention relates to certain improvements in the construction of nuts which are used on bolts in mechanical constructions, where the nut is liable to be worked loose from jarring, or other causes.

Said improvement consists in the construction of a nut with a conical-shaped hole formed in the back thereof, which is used in combination with a conical-formed jam-washer, having one or more slots cut in its sides, and a thread cut in the hole in the centre of the washer, the nut and washer being so constructed as to screw on the bolt together, so that when the washer is brought to a bearing, the nut shall advance with its conical interior hole over the washer, and thus clamp or jam the side of the washer on to the bolt, thus firmly securing the nut and washer to the bolt.

A common example of the application of this device is seen in the bolts uniting "fish-plates" to rail-road-rails, the peculiar utility of this invention consisting in its cheapness and simplicity, and the facility which it affords for tightening up the nut on the bolt, and at the same time securing it in any desired position after such tightening.

To enable others skilled in the art to make and use my invention, I will proceed to describe its construction and operation.

In the accompanying drawing, B represents a nut, which can be of any desired form, and which has the central hole H, with an interior thread in the same, and a conical-shaped cavity, E, in its back, as seen in figs. 4.

The jam-washer C, shown in fig. 5, has a central hole, G, with an interior thread cut therein, and has the slots D D D D cut in its sides, as shown.

The exterior form of this washer corresponds with the interior of the cavity E in the nut B, excepting that the diameter of the face of the washer C is slightly greater than the large diameter of the cavity E.

The bolt, A, shown, is of ordinary form, and has a thread cut on its end, corresponding to the threads in the washer C and nut B.

In the application of this device, shown in fig. 3, F represents a block, through which the bolt A is passed, as shown.

The nut B and washer C are screwed on to the bolt A together, as shown in fig. 2, until the face of the washer C finds a bearing on the block F, when, as is readily seen, the washer C will stop advancing, and the nut B will advance over the washer C, and, from the size of the hole E, with respect to the washer C, will jam the sides of the washer C down on to the bolt A, the slots D D allowing the sides of the washer C to come together, and down on to the bolt A, as is readily seen.

It is evident that this operation will cause the washer C to clasp firmly on the bolt A, and that the nut B will be firmly held to the washer C by the friction between the face of the washer C and the interior of the hole E in the nut B.

The slots D may be one or more in number, and can extend partially through the washer C, as shown, or they may extend entirely through the washer C, thus dividing it in two or more parts, if desired.

Having thus fully described my invention,

What I claim therein as new, and desire to secure by Letters Patent, is—

The improved jam-nut herein described, composed of the nut B, with the conical hole E, and the conical washer C, with slots D D, the several parts being constructed and arranged substantially as and for the purpose herein described.

As evidence that I claim the foregoing, I have hereunto set my hand in presence of two witnesses, this 12th day of March, 1869.

BYRON W. NICHOLS.

Witnesses:
  E. D. ELY,
  F. TICKNERE.